(12) United States Patent
Bader (10) Patent No.: US 9,743,429 B2
(45) Date of Patent: Aug. 22, 2017

(54) CHANNEL ASSESSMENT SCHEME

(71) Applicant: KING ABDULLAH UNIVERSITY OF SCIENCE AND TECHNOLOGY, Thuwal (SA)

(72) Inventor: Ahmed Bader, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 14/441,919

(22) PCT Filed: Nov. 8, 2013

(86) PCT No.: PCT/IB2013/003109
§ 371 (c)(1),
(2) Date: May 11, 2015

(87) PCT Pub. No.: WO2014/072835
PCT Pub. Date: May 15, 2014

(65) Prior Publication Data
US 2015/0289290 A1   Oct. 8, 2015

Related U.S. Application Data

(60) Provisional application No. 61/724,917, filed on Nov. 10, 2012.

(51) Int. Cl.
| H04W 74/08 | (2009.01) |
| H04W 52/46 | (2009.01) |
| H04L 5/00 | (2006.01) |
| H04W 84/18 | (2009.01) |

(52) U.S. Cl.
CPC ....... H04W 74/0808 (2013.01); H04L 5/0035 (2013.01); H04W 52/46 (2013.01); *H04W 74/0833* (2013.01); *H04W 84/18* (2013.01)

(58) Field of Classification Search
None
See application file for complete search history.

(56) References Cited

U.S. PATENT DOCUMENTS

| 4,787,252 A | * | 11/1988 | Jacobson | .................. G01F 1/66 73/861.28 |
| 4,843,564 A | * | 6/1989 | Jenson | ...................... G01P 5/26 340/606 |
| 5,999,258 A | * | 12/1999 | Roberts | ............ H04B 10/07951 356/450 |

(Continued)

OTHER PUBLICATIONS

Korkmaz et al., "Urban Multi-Hop Broadcast Protocol for Inter-Vehicle Communications Systems", VANET 04; Proceedings of the ACM International Workshop on Vehicular Ad Hoc Networks, Oct. 1, 2004, pp. 76-85.*

(Continued)

*Primary Examiner* — Gregory Sefcheck
(74) *Attorney, Agent, or Firm* — Thomas | Horstemeyer, LLP (57) ABSTRACT

A source node in a multihop network determines whether to transmit in a channel based on whether the channel is occupied by a packet transmission with a large number of relays; whether the source node is in the data tones back-off zone; and the source node is in the busy tone back-off zone.

23 Claims, 5 Drawing Sheets

(56) References Cited

U.S. PATENT DOCUMENTS

| | | | | |
|---|---|---|---|---|
| 6,002,361 A * | 12/1999 | Schipper | G01S 19/22 342/357.61 |
| 6,084,927 A * | 7/2000 | Pon | G01S 19/22 375/340 |
| 6,658,045 B1 * | 12/2003 | Jin | H04B 1/7115 375/141 |
| 6,768,969 B1 * | 7/2004 | Nikitin | G06K 9/00536 324/76.11 |
| 6,904,390 B2 * | 6/2005 | Nikitin | G06K 9/00536 324/521 |
| 6,954,800 B2 * | 10/2005 | Mallory | H04L 1/0003 709/231 |
| 7,188,053 B2 * | 3/2007 | Nikitin | G06K 9/00536 324/512 |
| 8,081,592 B2 * | 12/2011 | Sampath | H04W 52/243 370/237 |
| 8,265,742 B2 * | 9/2012 | Nikitin | G06F 17/18 600/544 |
| 8,296,087 B2 * | 10/2012 | Kalinin | B60C 23/0408 702/75 |
| 8,391,199 B2 * | 3/2013 | Sampath | H04W 52/243 370/230 |
| 8,416,728 B2 * | 4/2013 | Sampath | H04W 52/243 370/237 |
| 8,576,872 B2 * | 11/2013 | Agrawal | H04W 52/325 370/343 |
| 8,604,954 B2 * | 12/2013 | Chen | H03M 1/1009 341/120 |
| 9,294,312 B2 * | 3/2016 | Kil | H04L 25/022 |
| 2001/0030697 A1 * | 10/2001 | Dischert | H04N 9/093 348/263 |
| 2005/0267370 A1 * | 12/2005 | Park | G01S 11/10 600/454 |

OTHER PUBLICATIONS

"An Efficient Multi-Carrier Position-Based Packet Forwarding Protocol for Wireless Sensor Networks", Telecom ParisTech, Bader et al., pp. 1-29, Aug. 9, 2011.*

* cited by examiner

CHANNEL ASSESSMENT SCHEME

CLAIM OF PRIORITY

This application claims the benefit under 35 USC 371 to International Application No. PCT/IB2013/003109, filed Nov. 8, 2013, which claims priority to U.S. Provisional Application No. 61/724,917, filed Nov. 10, 2012, each of which is incorporated by reference in its entirety.

TECHNICAL FIELD

The present invention relates to a multihop network such as a wireless sensor network, and a scheme for a node in the network to assess a channel.

BACKGROUND

Mobile multihop networks have been considered lately as viable alternatives for the delivery and sharing of multimedia content between users. Performance of such networks is typically measured in terms of conflicting objectives, namely: end-to-end latency, end-to-end energy consumption, and network throughput. Subsequently, this calls for a packet delivery protocols which are able to establish a careful balance between these objectives. Recently, a packet forwarding protocol has been developed to meet such objectives. See Bader, Ahmed et al., "An Efficient Multi-Carrier Position-Based Packet Forwarding Protocol for Wireless Sensory Network," IEEE Transaction on Wireless Communications, Volume 11, no. 1 (January 2012), the content of which is incorporated by reference in its entirety.

For example, the protocol is built using orthogonal frequency division multiplexing (OFDM) for the physical (PHY) layer. Furthermore, the protocol utilizes position-based channel access techniques in conjunction with the OFDM PHY. This allows all eligible relays at a given hop to access the channel concurrently. Due to this property, the protocol is labelled as "multi-relay." The protocol is indifferent to mobility since it does not mandate relays to have knowledge of the network topology. The use of OFDM makes it also quite resilient to fast fading environments and thus well-suited for mobility.

SUMMARY

One aspect of present invention provides a source node in a multihop network having a circuit that determines whether a channel is occupied by a packet transmission meeting predetermined criteria; wherein the source node determines whether to transmit in the channel based on the determination that the channel is occupied by a packet transmission meeting predetermined criteria; and wherein the criteria is based on a normalized auto-covariance of the power spectral density (PSD) of a total interference signal.

In another aspect of the present invention, the source node further determines whether it is in a data back-off zone by detecting data tones, and determines whether to transmit in the channel based on whether the node is in the data back-off zone. Typically, data tones correspond to subcarriers. Busy tone, however, may be of a single subcarrier dedicated to carrying the busy tone.

In another aspect of the present invention, the source node further determines whether it is in a busy tone back-off zone by detecting a busy tone, and determines whether to transmit in the channel based on whether the node is in the busy tone back-off zone.

In another aspect of the present invention, the source node transmits in the channel in a case that the channel is not occupied by a packet transmission meeting the predetermined criteria, the source node is not in the data tones back-off zone, and the source node is not in the busy tone back-off zone.

In another aspect of the present invention, the source node listens to the channel for an extended period and re-assess in a case that the channel is occupied by a packet transmission meeting the predetermined criteria, the source node is not in the data tones back-off zone, and the source node is in the busy tone back-off zone.

In another aspect of the present invention, the source node extracts a destination position from the busy tone, and transmits in the channel if an angle between the source node's destination and that of an ongoing transmission is $>\pi/2$, in a case the source node is in the data tones back-off zone, and the source node is in the busy tone back-off zone.

In another aspect of the present invention, the source node does not transmit in a channel in a case that the channel is not occupied by a packet transmission meeting the predetermined criteria, the source node is not in the data tones back-off zone, and the source node is in the busy tone back-off zone.

In another aspect of the present invention, the source node transmits in the channel in a case that the channel is occupied by a packet transmission meeting the predetermined criteria, the source node is in the data tones back-off zone, and the source node is not in the busy tone back-off zone.

In another aspect of the present invention, the source node does not transmit in the channel in a case that the channel is not occupied by a packet transmission meeting the predetermined criteria, the source node is in the data tones back-off zone, and the source node is in the busy tone back-off zone.

DETAILED DESCRIPTION OF THE SYSTEM

A multihop network includes a plurality of communication devices. An example is a wireless communication device. In a wireless sensor network, each of the communication devices is also a sensor.

The communication device is referred to as a node. A node transmitting data is a source node. Nodes that transmit or retransmit the data are also called relays.

A source node may not able to estimate the number of relays in the nearby ongoing packet transmission for the following reasons:

1. Current known packet structure does not provide information for such estimation. The estimation of the number of relays requires an "improved packet structure" such as one described in 61/717,289, filed Oct. 23, 2012, incorporated by reference in its entirety.

2. To exploit the improved packet structure, a node should switch to coherent channel assessment mode, i.e. it should synchronize with the ongoing packet transmission. This is typically a less-efficient method of channel assessment.

3. The source node will be able to synchronize to the ongoing packet transmission only if it lies inside the coverage perimeter shown in FIG. 4 below. This is a case which does not occur very often.

4. Furthermore, one aspect of present invention is directed to cases where a source node lies inside one or both of the back-off zones but outside the coverage perimeter (discussed below).

Consequently, a source node utilizes a multi-stage channel assessment scheme:

1. The classical non-coherent energy detection method, whereby the node measures the energy on the data tones as well as the busy tone.

2. The source node performs the normalized auto-covariance computation described below to estimate whether it is in the vicinity of a packet transmission with a large number of relays. It will not be able to estimate how many relays there are, but just determine whether it is a large number or not, which is sufficient to make an educated decision. This is also a non-coherent method, which makes sense to use here, since the node may typically be outside the coverage perimeter of the ongoing transmission, i.e. it will not be able to synchronize with that transmission.

3. The third stage is reverted to only in certain scenarios as explained in the decision table below. In this stage, the source node extracts the position of the destination from the busy tone signal.

One aspect of present invention provides feature-based assessment of a channel. A node wishing to access the channel performs an analysis of the interference signal's features. Using such an approach, it gains valuable knowledge about its vicinity in comparison to the case where only traditional assessment techniques are used. The improved scheme increases the throughput performance and reduces of channel access delay. A direct consequence of this is the reduction of jitter, which is one of the major concerns within the context of multimedia content delivery.

Figure 1:
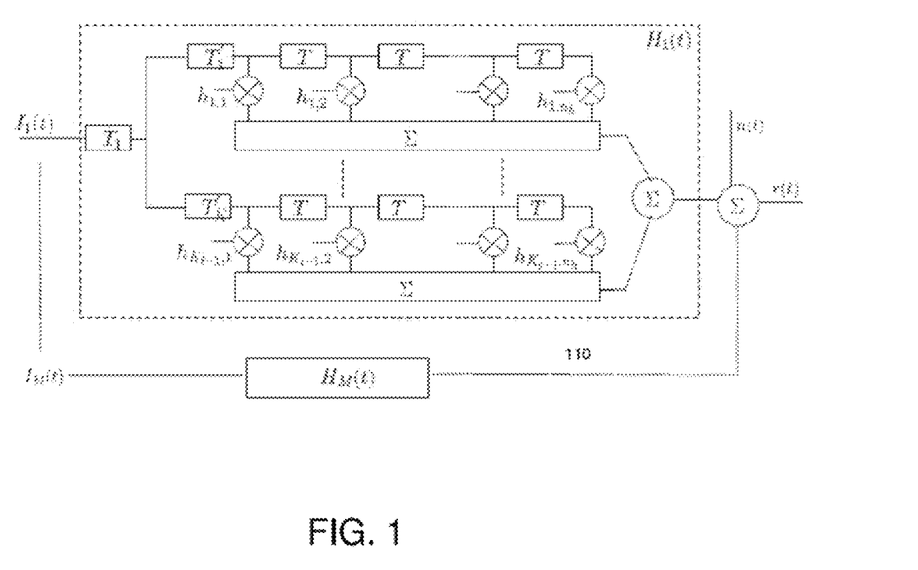
FIG. 1 illustrates a channel model of the total interference signal.
Figure 2:
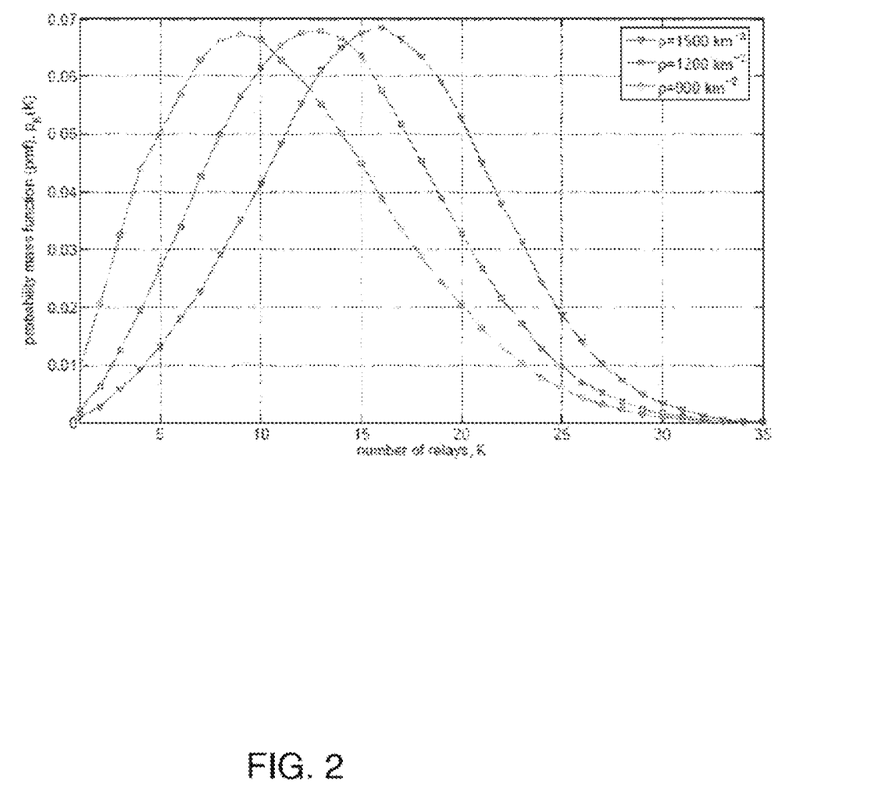
FIG. 2 shows the probability mass function for the number of relay at an arbitrary hop.

A source node assesses a channel before accessing it. A channel model is illustrated in FIG. 1. See Bader, Ahmed et al., "An Efficient Multi-Carrier Position-Based Packet Forwarding Protocol for Wireless Sensory Network," IEEE Transaction on Wireless Communications, Volume 11, no. 1 (January 2012), the content of which is incorporated by reference in its entirety. Very often, the observing node (the source node) will lie in the vicinity of a packet transmission featuring a large number of relays. Under such circumstances, the features of the resulting total interference signal are dominated by that transmission. In fact, it is quite likely to be in such a situation. The probability mass function (PMF) of the number of relays per transmission is plotted in FIG. 2 for various node densities. As illustrated in the figure, transmissions with large K are quite probable particularly at higher node densities. Under such circumstances, the total interference signal will show noticeable correlation across the frequency domain. Such a correlation is best captured by the observing node by computing the normalized auto-covariance of the power spectral density (PSD) of the total interference signal. This can be conveniently accomplished by exploiting the fact that nodes readily deploy Fast Fourier Transform (FFT) circuits which are required for the operation of the OFDM PHY. There are various algorithms in practice for the computation of the FFT. However, they are almost all based around the Discrete Fourier Transform (DFT) which is a well-known algorithm. The normalized auto-covariance is computed by the observing node as follows:

$$X_{cov}(c) = \begin{cases} \frac{1}{X_o} \sum_{n=0}^{N_s-c-1} (P_I(n+c) - \overline{P}_I)(P_I(n) - \overline{P}_I), & c = 0 \ldots N_s - 1 \\ X_{Cov}(-c), & c = -N_s \ldots 0 \end{cases} \quad (1)$$

where $\overline{P}_I = \frac{1}{N_a} \sum_{i=0}^{N_s-1} P_I(i)$ and $X_o = \sum_{n=0}^{N_s-1} (P_I(n) - \overline{P}_I)^2$.

Figure 3A:
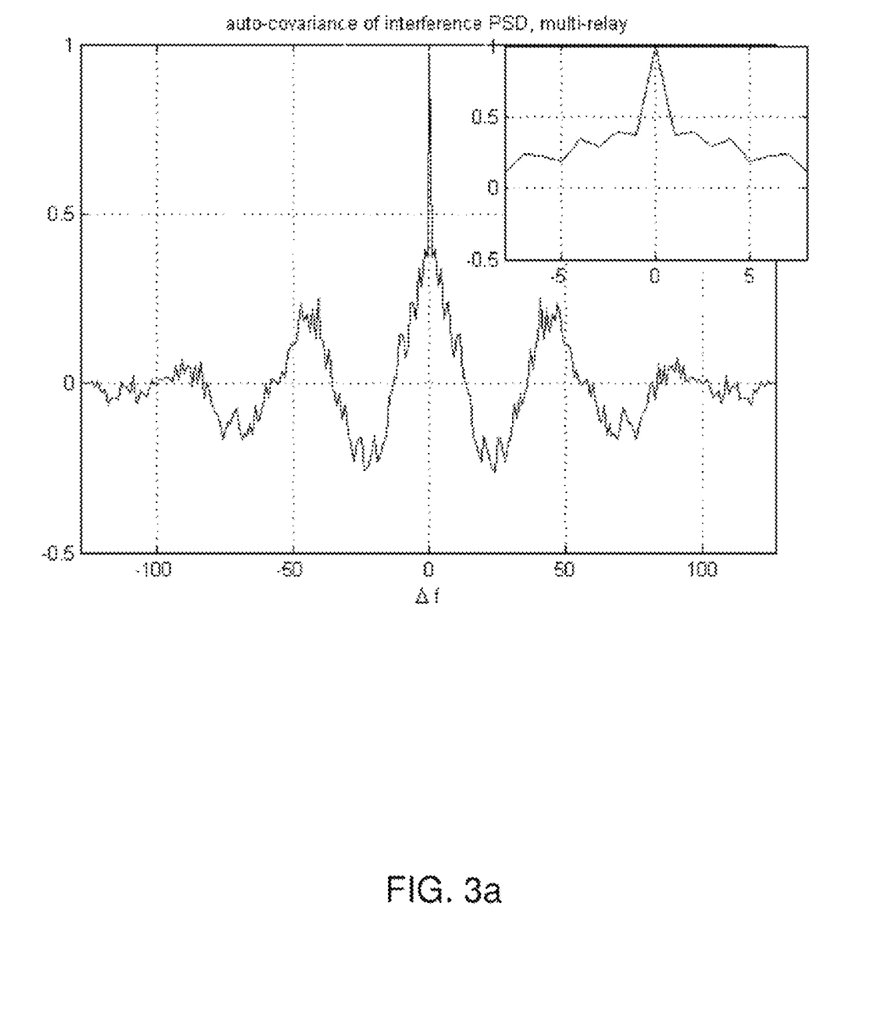
FIG. 3a illustrates sample realization of the interference-plus-noise auto-covariance of the power spectral density (PSD) in a multi-relay case.
Figure 3B:
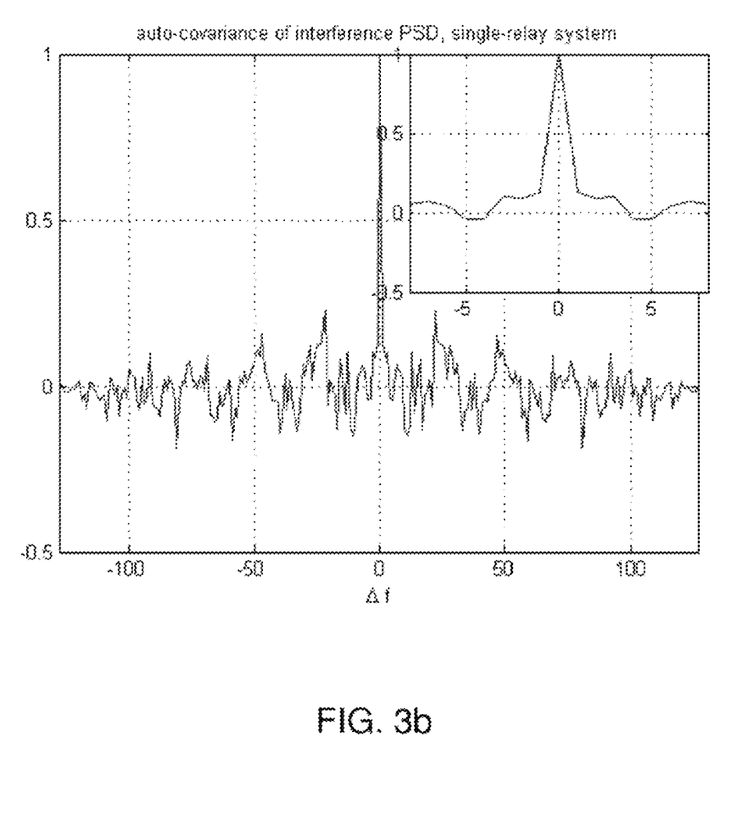
FIG. 3b illustrates sample realization of the interference-plus-noise auto-covariance of the power spectral density (PSD) in a single-relay case

In contrast, the interference PSD in the case of single-relay systems features very low correlation across the frequency domain. In fact, the more concurrent single-relay transmissions there are, the less correlation is observed. Sample realizations of the interference PSD for both cases are shown in FIGS. 3a and 3b.

A simple yet effective characterization of the correlation featured by $X_{cov}$ is the first zero-crossing. The larger the number of relays K is, the larger this zero-crossing is expected to be. The improved scheme developed in this invention further introduces an additional feature. The busy tone (BT) signal is conventionally a continuous analog signal. In our case, the BT signal is modulated with the position of the destination node.

Figure 4:
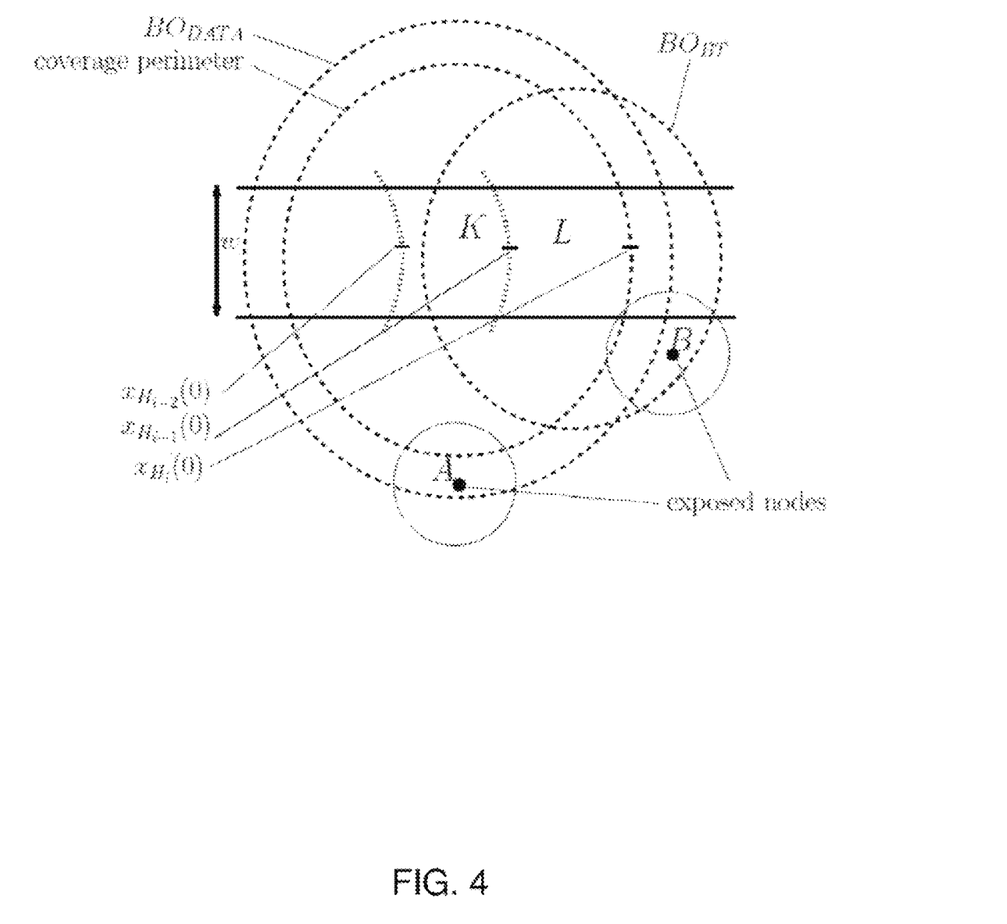
FIG. 4 illustrates the scheme for exposed nodes to capture more transmission opportunities.

The ability of the observing node to detect the presence of a "large-K" transmission and to know the destination of that transmission opens the door wide for more channel access opportunities. This is illustrated in FIG. 4. An exposed node utilizing classical channel assessment schemes will refrain from accessing the channel if it lies inside the back-off zone. The back-off zone is composed of two subzones, $BO_{DATA}$ and $BO_{BT}$, corresponding to the data tones back-off zone and busy tone back-off zone respectively. This is true even if the node lies outside the coverage perimeter of the nearby packet transmission. This is where feature detection lends itself to a more opportunistic channel access process.

In one aspect of present invention, a node determines whether it is in a back-off zone by means of an "energy detector." For the data tones back-off zone, the energy detector measures the aggregate energy level on those tones, outputs the average and compares it to a preset threshold. If larger than the threshold, the node decides that it is inside the data tones back-off zone.

An exposed node utilizing the improved assessment scheme of this invention first measures the PSD at the output of the FFT block. It then computes the first zero-crossing, denoted by $n_{fo}$, of $X_{cov}$. Denoting the decision threshold by $n_T$, then if $n_{fo} > n_T$ the node declares the channel as being one with a large number of relays.

The threshold $n_T$ setting depends on few factors such as the typical traffic load, node density, large-scale path loss coefficient, among other parameters. One way to set the threshold at a meaningful value is by means of simulations. One aspect of present invention provides that for typical network scenarios, setting $n_T=6$ is a reasonable choice.

Accordingly, it knows that injecting a new packet into the network is unlikely to interfere with the ongoing nearby transmission. At the same time, it is likely to find a few potential receivers. Such a scenario is applicable to node A in FIG. 4. Here, w is the forwarding strip width. L is the number of receivers for that packet transmission. As such, the number of nodes energizing the busy tone is also L. The coverage perimeter is simply the perimeter of the geographical area where the packet transmission can be received correctly. Additional information may be found in the incorporated "An Efficient Multi-Carrier Position-Based Packet Forwarding Protocol for Wireless Sensory Network" article.

For node B however, the improved algorithm introduces an additional stage in the decision-making process. Node B might not be able to properly characterize the PSD of the interference signal, since it lies outside $BO_{DATA}$. Nevertheless, it will be able to extract the position of the transmission's destination. The angle between the observing node's destination and that of the ongoing transmission is denoted by $\Delta\Theta_{dst}$. The observing node decides to transmit if $|\Delta\Theta_{dst}| > \pi/2$.

The various decision-making cases for this improved channel assessment scheme are highlighted in Table I below:

TABLE I

DECISION TABLE FOR CHANNEL ACCESS

| Case | in $BO_{DATA}$ | in $BO_{BT}$ | Large K | Prior Art | Improved Scheme |
|---|---|---|---|---|---|
| 1 | n | n | n | transmit | transmit |
| 2 | n | n | y | transmit | keep listening to the channel for a period < $T_p$ then re-assess. |
| 3 | n | y | — | back off | extract destination position from the BT signal. if $\Delta\theta_{dst} > \pi/2$ then transmit, otherwise back off. |
| 4 | y | n | n | back off | back off |
| 5 | y | n | y | back off | transmit |
| 6 | y | y | n | back off | back off |
| 7 | y | y | y | back off | back off |

Case 3 of Table I may occur in lightly-loaded networks. For the sake of extracting the position of the destination, the observing node needs to switch from simple energy detection to coherent channel assessment. The node needs to synchronize with the BT signal in that case.

For Case 2, the packet flow is very likely to be moving away from the observing node. For a higher degree of confidence, it may be possible to extend the channel sensing activity for a few more samples (extended period) and then re-assess.

What is claimed is:

1. A source node in a multihop network, comprising:
   a transmitter circuit that is configured to transmit a packet over a wireless channel; and
   a sensor circuit that is configured to assess a correlation of a frequency spectrum of the wireless channel;
   wherein the sensor circuit is configured to compute zero-crossings for an auto-covariance of a power spectral density of a total interference signal;
   wherein the sensor circuit determines the wireless channel to be highly correlated when a spacing between the zero-crossings is larger than a predetermined threshold value;
   wherein the sensor circuit determines whether the source node is in a data tones back-off zone by averaging aggregate energy levels on the data tones, and determines whether to transmit in the wireless channel based on whether the source node is in the data tones back-off zone;
   wherein the sensor circuit determines whether the source node is in a busy tone back-off zone by at least detecting a busy tone, and further determines whether to transmit in the wireless channel based on whether the source node is in the busy tone back-off zone; and
   wherein the sensor circuit extracts a destination position from the busy tone, and transmits in the wireless channel if an angle between the source node's destination and that of an ongoing transmission is $>\pi/2$, in a case the source node is not in the data tones back-off zone, and the source node is in the busy tone back-off zone.

2. The source node according to claim 1, wherein the busy tone is modulated with position information of a destination node.

3. The source node according to claim 1, wherein the power spectral density is measured at an output of a Fast Fourier Transform circuit.

4. The source node according to claim 1, wherein the predetermined threshold value is based on typical traffic load, node density, or large-scale path loss coefficient.

5. The source node according to claim 1, wherein the transmitter circuit is configured to transmit in the wireless channel in a case that the wireless channel is determined to not be highly correlated, the source node is not in the data tones back-off zone, and the source node is not in the busy tone back-off zone.

6. The source node according to claim 1, wherein the sensor circuit of the source node listens to the wireless channel for an extended period and is configured to re-assess in a case that the wireless channel is determined to be highly correlated, the source node is not in the data tones back-off zone, and the source node is not in the busy tone back-off zone.

7. The source node according to claim 1, wherein the transmitter circuit of the source node does not transmit in the wireless channel in a case that the wireless channel is determined to not be highly correlated, the source node is in the data tones back-off zone, and the source node is not in the busy tone back-off zone.

8. The source node according to claim 1, wherein the transmitter circuit of the source node transmits in the wireless channel in a case that the wireless channel is determined to be highly correlated, the source node is in the data tones back-off zone, and the source node is not in the busy tone back-off zone.

9. The source node according to claim 1, wherein the transmitter circuit of the source node does not transmit in the wireless channel in a case that the wireless channel is determined to not be highly correlated, the source node is in the data tones back-off zone, and the source node is in the busy tone back-off zone.

10. The source node according to claim 1, wherein the transmitter circuit of the source node does not transmit in the wireless channel in a case that the wireless channel is determined to be highly correlated, the source node is in the data tones back-off zone, and the source node is in the busy tone back-off zone.

11. The source node according to claim 1, wherein the sensor circuit of the source node further determines whether the source node is in a busy tone back-off zone by the detection of the busy tone and determining whether the wireless channel is highly correlated.

12. The source node according to claim 11, wherein the sensor circuit of the source node determines itself to be in the busy tone back-off zone when the busy tone is detected and the wireless channel is determined to not be highly correlated.

13. The source node according to claim 11, wherein the sensor circuit of the source node determines itself to not be in the busy tone back-off zone and the data tone back-off zone when the busy tone is not detected and the wireless channel is determined to not be highly correlated.

14. The source node according to claim 11, wherein the busy tone is modulated with position information of a destination node, wherein the source node is configured to determine its position with respect to a packet flow direction based at least in part on the position information of the destination node.

15. A method for operating a source node in a multihop network, comprising:
  computing zero-crossings for an auto-covariance of a power spectral density of a total interference signal over a wireless channel of the multihop network;
  determining the wireless channel to be highly correlated when a spacing between the zero-crossings is larger than a predetermined threshold value;
  determining whether the source node is in a data tones back-off zone by detecting energy on the data tones;
  determining whether the source node is in a busy tone back-off zone by detecting a busy tone;
  extracting a destination position from the busy tone; and
  selecting to transmit a signal from the source node over the wireless channel based at least in part on the following determinations:
    whether the wireless channel is highly correlated,
    whether the source node is in the data tones back-off zone,
    whether the source node is in the busy tone back-off zone by detecting a busy tone, and
    whether an angle between the source node's destination position and that of an ongoing transmission is $>\pi/2$, in a case that the source node is not in the data tones back-off zone, and the source node is in the busy tone back-off zone.

16. The method according to claim 15, wherein the busy tone is modulated with position information of a destination node.

17. The method according to claim 15, wherein the power spectral density is measured at an output of a Fast Fourier Transform circuit.

18. The method according to claim 15, further comprising transmitting in the wireless channel in a case that the wireless channel is determined to not be highly correlated, the source node is not in the data tones back-off zone, and the source node is not in the busy tone back-off zone.

19. The method according to claim 15, further comprising listening to the wireless channel for an extended period and re-assessing in a case that the wireless channel is determined to be highly correlated, the source node is not in the data tones back-off zone, and the source node is not in the busy tone back-off zone.

20. The method according to claim 15, further comprising not transmitting in the wireless channel in a case that the wireless channel is determined to not be highly correlated, the source node is in the data tones back-off zone, and the source node is not in the busy tone back-off zone.

21. The method according to claim 15, further comprising transmitting in the wireless channel in a case that the wireless channel is determined to be highly correlated, the source node is in the data tones back-off zone, and the source node is not in the busy tone back-off zone.

22. The method according to claim 15, further comprising not transmitting in the wireless channel in a case that the wireless channel is determined to not be highly correlated, the source node is in the data tones back-off zone, and the source node is in the busy tone back-off zone.

23. The method according to claim 15, further comprising not transmitting in the wireless channel in a case that the wireless channel is determined to be highly correlated, the source node is in the data tones back-off zone, and the source node is in the busy tone back-off zone.

\* \* \* \* \*